United States Patent [19]

Nakayashiki et al.

[11] Patent Number: 4,887,256
[45] Date of Patent: Dec. 12, 1989

[54] DATA COMMUNICATION NETWORK SYSTEM AND RECONFIGURATION CONTROL METHOD

[75] Inventors: Susumu Nakayashiki, Sagamihara; Jiro Kashio, Kawasaki; Takeshi Harakawa, Hadano, all of Japan

[73] Assignee: Hitachi, Ltd., Tokyo, Japan

[21] Appl. No.: 291,308

[22] Filed: Dec. 28, 1988

Related U.S. Application Data

[62] Division of Ser. No. 171,698, Mar. 22, 1988, Pat. No. 4,815,069.

[30] Foreign Application Priority Data

Jul. 10, 1987 [JP] Japan .................................. 62-170953

[51] Int. Cl.⁴ ............................................. H04J 3/14
[52] U.S. Cl. ........................................ 370/16; 370/15
[58] Field of Search ..................... 370/13, 15, 16, 86, 370/88; 371/8, 11

[56] References Cited

U.S. PATENT DOCUMENTS 3,652,798  3/1972  McNeilly et al. ..................... 370/16
4,190,821  2/1980  Woodward ............................ 370/16
4,553,233  11/1985 Debuysscher et al. ............... 370/16
4,763,315  8/1988  Nakayashiki et al. ................ 370/15
4,815,069  3/1989  Nakayashiki et al. ................ 370/15

Primary Examiner—Robert L. Griffin
Assistant Examiner—Wellington Chin
Attorney, Agent, or Firm—Antonelli, Terry & Wands

[57] ABSTRACT

In a communication system having first and second ring transmission lines for connecting a plurality of stations and for providing opposite signal transmission direction, a first station, which is located just downstream side of a failure point occurred in the first transmission line, sends out a beacon signal along said first transmission line while causing an intentional failure in the second transmission line on its downstream side and a second station, which is located just upstream side of the failure point on the first transmission line, forms a first loop-back path (WRAPA) by detecting the intentional failure on the second transmission line if the second station has received the beacon signal. The first station forms a second loop-back path (WRAPB) by receiving the beacon from the second transmission line which is sent back by the second station.

3 Claims, 17 Drawing Sheets

DATA COMMUNICATION NETWORK SYSTEM AND RECONFIGURATION CONTROL METHOD

This is a division of application Ser. No. 171,698, filed Mar. 22, 1988 U.S. Pat. No. 4,815,069.

BACKGROUND OF THE INVENTION

The present invention relates to a data communication network system, and in particular to reconfiguration control of a network which, upon occurrence of a failure or abnormality in communication function of the network, rapidly disconnects the failure, portion to recover the communication function.

As for the communication network system comprising a plurality of stations connected via at least one ring-shaped transmission line or path, a method to counter a failure caused in a dual ring network comprising first and second ring transmission lines is described in JP-W-61-500700 entitled "Data Transmission System and Method" by Nicholas C. L. Beale et al. (International patent application No. PCT/GB84/00366), for example.

In accordance with the above described prior art, each station sends a notice frame BCN (beacon) toward downstream of the first ring when the station has detected in the first ring abnormality such as a break of the transmission path, break down of a device or simply the receipt of unrecognisable data, for example. Each station which has received BCN relays the BCN to downstream stations and sends a failure acknowledge frame ACK to the second ring. If the station which has sent BCN can not receive BCN from upstream for a predetermined time period, the station forms a loop-back transmission path (WRAPB) from the second ring to the first ring. A station which can not receive ACK in a predetermined time period since the reception of BCN forms a loop-back transmission path (WRAPA) from the first ring to the second ring.

In accordance with the above described prior art, however, a loop-back transmission path is formed under the condition that BCN or ACK is not received for a predetermined time period or longer. Therefore, it takes time longer than the above described predetermined time period to complete the countermeasure against the failure, resulting in a problem of delayed resumption of communication.

In U.S. patent application Ser. No. 826,255 filed in Feb. 5, 1986, the present inventors proposed a network reconfiguration control method, whereby a first station which has detected abnormality in the first ring and sent BCN to downstream of the first ring waits for the reception of BCN from the first ring while stopping the signal relay operation in the second ring. In accordance with this method, the first station which is sending BCN intentionally causes a failure at such a location in the second ring as to form a counterpart to the location of the true failure in the first ring. Accordingly, a second station adjoining the first station via the true failure location is able to detect abnormality in the second ring. The second station receives the BCN sent by the first station via the first ring and senses the abnormality of the second ring. As a result, the second station is able to recognize that the second station itself is the station which should form the loop-back transmission path (WRAPA) extending from the first ring to the second ring.

In the above described prior patent application, the formation of the loop-back transmission path (WRAPB) extending from the second ring to the first ring by the first station is conditioned upon continuation of the BCN waiting state in the first ring for the predetermined time period or longer.

SUMMARY OF THE INVENTION

An object of the present invention is to provide a data communication network system and a reconfiguration control method whereby the communication function can be recovered in a short time upon occurrence of a failure or abnormality.

Another object of the present invention is to provide a data communication network system and a reconfiguration control method which are effective to the occurrence of multiple failures.

In accordance with the present invention, therefore, a method for controlling a plurality of stations in a communication system which comprises first and second ring transmission lines for connecting said stations and for providing opposite signal transmission directions, comprises the steps of; operating a first one of said stations when a failure occurs in said first transmission line to send out a notice signal along said first transmission line and to wait said notice signal sent back from said second transmission line while causing a false failure in said second transmission line on its downstream side; operating a second one of said stations which receives said notice signal from said first transmission line to form a transmission path from said first transmission line to said second transmission line if said second station detects an effective failure in said second transmission line so that said notice signal is sent back to said first station via said second transmission line; and operating said first station to form a transmission path from said second transmission line to said first transmission line when the first station receives said notice signal from said second transmission line.

That is to say, a station which has detected failure or abnormality on one of the dual ring transmission lines intentionally causes a failure (false failure) in the other ring transmission line so as to form a counterpart to the abnormality. If the data transmission directions on dual ring transmission lines are opposite each other, it is possible to inform upstream stations in one ring of the abnormality by the false failure caused in the other ring.

For attaining high reliability of the network, it is inadvisable to dispose a special station such as a master station. In accordance with the present invention, therefore, all stations are controlled on equal terms, i.e., by identical logic. As described above, the first transmission line is physically equalized to the second transmission line, and all stations are physically equalized. Thereafter, one of the transmission lines is selected to connect various types of computers and terminals, and a specific station for collecting statistical abnormality information is designated.

The use of the false or intentional failure as abnormality occurrence notifying means is especially effective in a ring network described in "Token Ring Access Method and Physical Layer Specifications", IEEE Standard 802.5 - 1985 (ISO/DP8802/5).

In accordance with the above described specifications, each station sends out physical signals to respective transmission lines in synchronized with its input physical signals, and a station, which has detected abnormality in the physical signal extending over several bits such as a fact that the polarity which should periodically change in case of the normal state does not change for a predetermined time period or longer, newly sends out the normal physical signal by using its own timing generation mechanism as described in "6.2 Symbol Decoding", of the above described literature on P. 74. As a result, stations located downstream side of that station which has detected abnormality do not detect the abnormality in the above described physical signal. In accordance with the present invention, it is possible to take a measure against the failure by using the above described property. That is to say, the station which has detected abnormality of the physical signal in the first (active) ring produces a failure (false failure) causing abnormality of the physical signal in the second (stand-by) ring having the opposite data transmission direction. On the basis of the above described specifications, therefore, only the station located immediately downstream in the second ring detects abnormality of the physical signal. At this time, therefore, the failure portion is localized and the stations which should undergo a measure against the failure is designated. It thus becomes possible to take a measure against the failure more rapidly as compared with the prior art.

However, it is impossible to discriminate the failure by only detecting the above described false failure. That is to say, it is impossible to distinguish a failure caused in only the second ring from a failure forming a counterpart to a failure of the first ring, for example. Unless the discrimination is possible, a loop-back transmission path is unadvantageously formed even if the active transmission line is normal and a failure is caused only in the second ring forming the stand-by transmission line. In accordance with the present invention, the station which has detected abnormality in the first ring sends an abnormality notice signal referred to as Beacon (hereafter abbreviated to BCN) to the first ring first of all to let all downstream stations know a fact that the first ring is abnormal so that such a failure countermeasure as to affect the communication in the first ring may be taken only when the first ring is abnormal. When a station which has received the above described BCN from the first ring detects the above described abnormality of the physical signal in the second ring, a loop-back transmission path (WRAPA) from the first ring to the second ring is formed. And a station which has detected abnormality of the physical signal in the first ring forms a loop-back transmission path (WRAPB) extending from the second ring to the first ring when the station receives BCN returned from the second ring. Thereby, the ring reconfiguration control (failure countermeasure) caused by a failure existing in only the second ring is avoided.

In applying this to the above described ring network of IEEE 802.5, WRAPB is formed at the time when the station which has detected abnormality of the physical signal in the first ring detects the fact that the BCN sent to the first ring from that station is looped back by a station assuming the WRAPA state and returned to that station via the second ring. As a result, the station serving as the WRAPB is able to confirm that a closed ring has been formed by reconfiguration. Accordingly, this station is able to serve as an active monitor having the right to generate a token on the network. In accordance with the present invention, therefore, competition among a plurality of stations in defining the active monitor is avoided when the reconfiguration of the network has been completed. And only one station which has assumed the WRAPB state becomes the active monitor, while other stations are defined to become stand-by monitors. It is thus possible to quicken the recovery of the MAC protocol.

On the other hand, the above described condition does not hold true in some cases if multiple failures occur on the network. In such a case, the following control is performed in accordance with the present invention. The station which has received BCN from the first ring forms WRAPA unless the station can receive BCN from the second ring within a predetermined time even though abnormality of the physical signal is not detected in the second ring. A station which has detected abnormality of the physical signal in the first ring is isolated from other stations if the station can receive BCN sent to the first ring by that station from neither the first ring nor the second ring within a predetermined time period. This situation corresponds to a case where both upstream and downstream of that station are faulty. If a closed ring (local ring) can be formed by that station alone in this case, that state may be assumed. Otherwise, the WRAPB state may be assumed.

In the foregoing description, a countermeasure in case a failure caused by abnormality of the physical signal (hereafter referred to as PHY failure) has been described. In failures of the network, there are various failures other than the PHY failure. For example, there is a failure in which communication of the token and frame (OSI layer 2: data link level information) is unsuccessful although the physical signal (OSI layer 1: physical level information) is normal. This failure is referred to as a MAC (Medium Access Control) failure. The present invention also provides a countermeasure against this MAC failure. Assuming that a ring network described in the above described IEEE 802.5 is used, the MAC failure is different from the PHY failure in the following point. That is to say, the PHY failure is detected as abnormality of the physical signal by only the station located immediately downstream with respect to the failure. In the MAC failure, however, it is not uniquely determined which station in the ring previously detects abnormality, and special control is needed to localize the failure portion. The control for localizing the MAC failure will now be described. In a so-called token ring network, for example, the MAC failure can be detected on the basis of a fact that the token cannot be received within an expected time period. A station which does not receive a token within a predetermined time period sends BCN. (Several other control schemes are involved until BCN sending in the above described IEEE 802.5. However, these control schemes are not described here since they are not directly related to the present invention.) When the station receives BCN from upstream of that ring transmission line, the station stops BCN sending and assumes a state for relaying the received BCN. As a result, the station which continues to send BCN for a predetermined time period or longer can be recognized as the station located immediately downstream with respect to the failure. Once the station is recognized, it is possible to take a measure against the failure thereafter in accordance with the same control procedure as that described in case of the aforementioned PHY failure.

As a countermeasure to multiple failures, a station assuming the loop-back transmission path state is so adapted as not to release the loop-back transmission path even if the station detects further new abnormality.

By thus keeping from releasing the loop-back path, it is possible to reduce the number of stations which newly form loop-back paths upon occurrence of multiple failures. Upon occurrence of a new failure in a ring network system which has already been looped back, for example, a closed ring can be formed provided that only another station newly forms a loop-back path. It is thus possible to shorten the time required for the countermeasure to failures in case of multiple failures. The control of loop-back release is rational in view of the meaning of the loop-back. If a loop-back path is already formed, it means that a ring free from a failure has already been formed. Detection of a new failure in that ring has no relation to the recovery from the failure which caused the previous loop-back. Even if abnormality is detected in that ring transmission line, therefore, it is not necessary to release the loop-back. Even if the station assuming the loop-back transmission state detects abnormality in that ring, it is assumed that the station need not judge whether the loop-back should be performed or not since the loop-back has already been performed. On this assumption, it is not necessary to make the station perform the control for recognizing the loop-back station. That is to say, it is not necessary to send out BCN for recognizing the transmission path loop-back station.

The BCN may be provided with classification by priority. For example, BCNs are divided into two kinds comprising BCNs for recognizing the failure portion (hereafter referred to as BN) and BCNs for recognizing a station which performs the reconfiguration control such as the transmission loop-back (hereafter referred to as BR). And BR is given priority over BN. Upon receiving BN or BR, therefore, the station which is sending BN stops BN sending and assumes the state for relaying the received BCN. On the other hand, the station which is sending BR stops BR sending and assumes the state for relaying the received BCN only when the station has received BR. The station which is not provided with the reconfiguration control function of loop-back or the station which has already formed the loop-back path sends BN when it detects abnormality in the ring. On the other hand, a station capable of forming a loop-back path sends out BR. Upon the occurrence of abnormality in the ring, therefore, the failure location can be regarded as immediately upstream with respect to the station which continues to send out BN or BR. And a station which continues to send out BR can be regarded as the station which should perform the transmission path loop-back.

When abnormality of the ring is detected, it is possible to determine whether BCN to be sent is BN or BR by providing each station with a special flag referred to as reconfiguration interlock flag (RIF), for example, so that each station may send out BN when the flag RIF is set to "0" and send out BR when the flag RIF is set to "1". By discriminating between the classes (BN and BR) of BCN to be sent by means of the flag RIF, localization of the failure portion and reconfiguration control with regard to multiple failures as well become possible in case stations which are not equipped with the reconfiguration control function (RIF="0") and stations equipped with the reconfiguration control function are mixed in the same ring. The stations equipped with the reconfiguration control function include stations which already performed the reconfiguration control with RIF="0" such as stations which already performed the transmission path loop-back and stations which did not performed the reconfiguration control yet with RIF="1".

The foregoing and other objects, advantages, manner of operation and novel features of the present invention will be understood from the following detailed description when read in connection with the accompanying drawings.

DESCRIPTION OF THE PREFERRED EMBODIMENTS

Embodiments of the present invention will now be described by referring to drawings.

Figure 1:
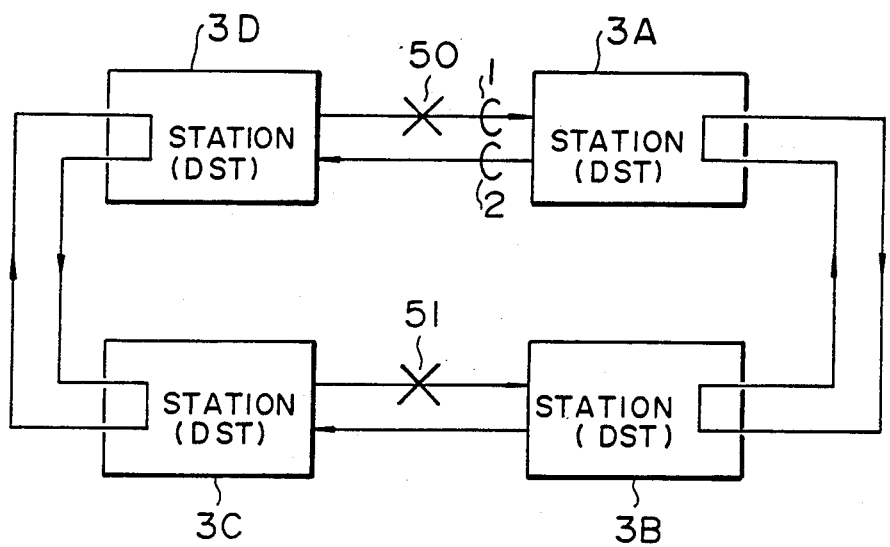
FIG. 1 schematically shows the entire configuration of a network system whereto the present invention is applied.

FIG. 1 schematically shows the entire configuration of a network communication system whereto the present invention is applied. Numerals 1 and 2 denote a first ring and a second ring, respectively. Numeral 3 (3A to 3D) denotes a dual ring station (hereafter abbreviated to DST). In the state shown in FIG. 1, loop-back of the transmission path is performed on the basis of a failure 50 caused in the first ring 1 and a failure 51 caused in the second ring 2, two separate rings being formed. The present invention relates to a countermeasure taken upon the occurrence of a failure (or failures) in such a ring network, i.e., control of the network transition from the normal state to the state shown in FIG. 1.

Figure 2:
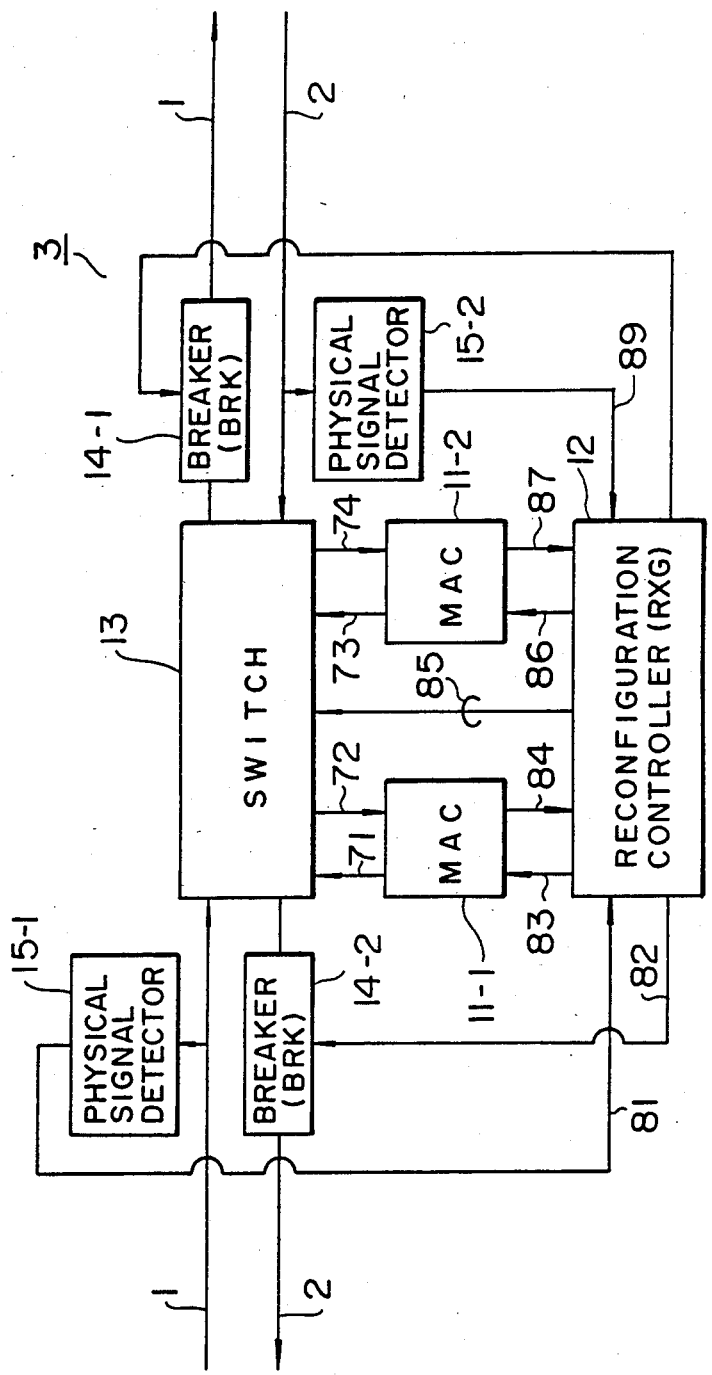
FIG. 2 shows the configuration of a dual ring station (DST).

FIG. 2 shows the internal configuration of the DST 3. Numeral 11 denotes a communication controller having function corresponding to the physical layer level communication function and the MAC (Medium Access Control) layer level communication function (hereafter referred to as MAC collectively) of ring network described in the aforementioned IEEE 802.5. The MACs include an MAC 11-1 handling the communication of the first ring system 1 and an MAC 11-2 handling the communication of the second ring system 2. Each of these MACs includes aforementioned timing signal generation mechanism as a part of the physical layer communication function though omitted from the drawing. Numeral 12 denotes a reconfiguration controller (hereafter referred to as RXG) having function for performing the ring reconfiguration when the communication function of the above described MAC or ring transmission line is abnormal. The RXG 12 has interfaces for the MAC 11-1 and the MAC 11-2 and always supervises whether the communication function of both MACs is normal or not. Numeral 13 denotes a transmission path disconnection switch (SW) used for the ring reconfiguration. On the basis of a command from the RXG, the SW 13 changes connection of switches into one of forms described below. Numerals 14-1 and 14-2 denote breakers (hereafter abbreviated to BRK) for causing such a false or intentional failure that downstream stations may recognize it as the occurrence of a failure. Numeral 15 denotes a physical signal detector (hereafter abbreviated to PSD). For example, the PSD 15 senses the generation of energy (such as current) on the transmission path caused by the sending operation of another station which has newly risen and triggers the network expansion. And the PSD 15 senses the fact that normal energy becomes abnormal (i.e., the above described abnormality of the physical signal) and triggers the countermeasure against a failure (i.e., the ring reconfiguration). In FIG. 2, numerals 71 to 74 denote data lines through which data propagated on the transmission paths 1 and 2 flow. Numerals 81 to 89 denote signal lines conveying control signals for reconfiguration control.

Figure 3:
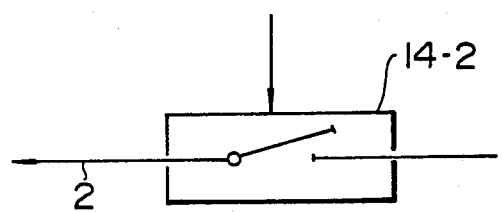
FIG. 3 shows an example of false failure generation mechanism.

FIG. 3 shows an embodiment of the breaker for causing false failure (BRK) 14. In the present embodiment, such a false failure as to make the physical signal abnormal is caused. For this purpose, the breaker has a switch for interrupting (opening) the ring transmission path to prevent the propagation of the physical signal. The false signal may also be generated by adopting another scheme such as a scheme stopping the function of a pulse generator circuit.

Figure 4:
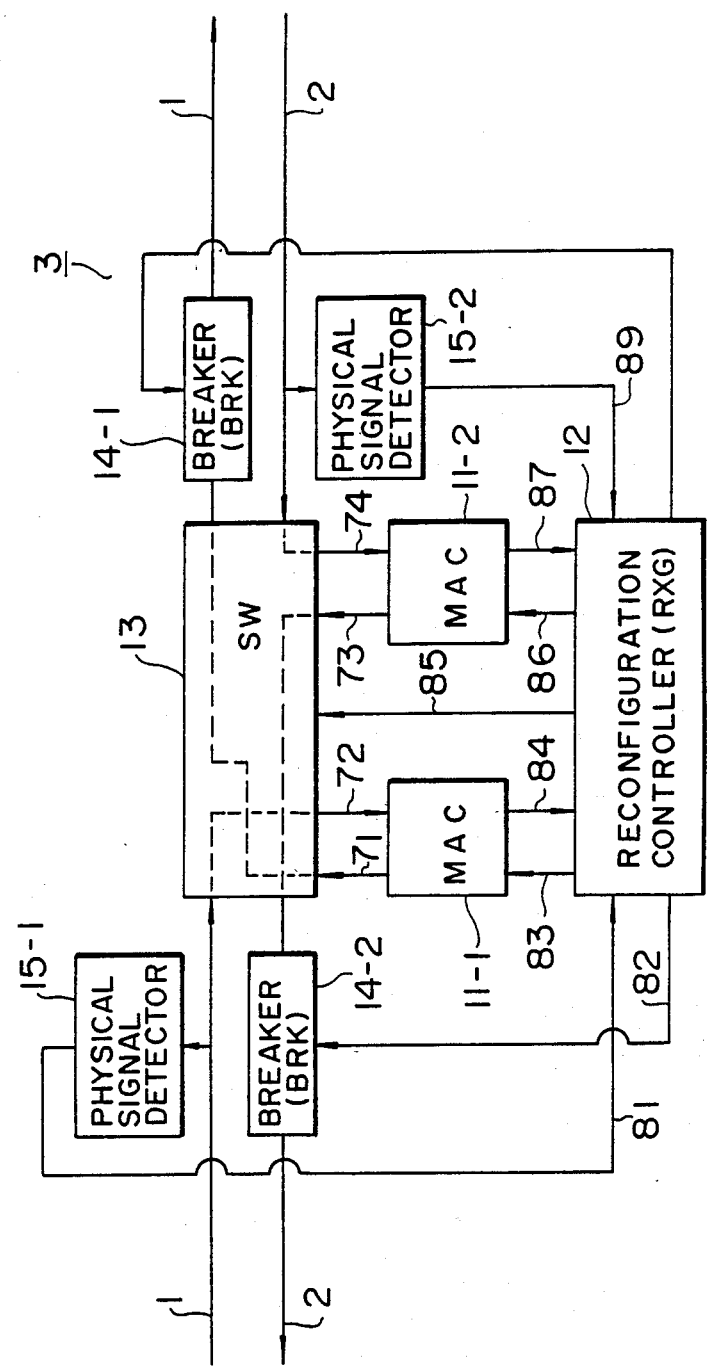
FIGS. 4 to 6 show various states of transmission path switches of a DST, respectively.
Figure 5:
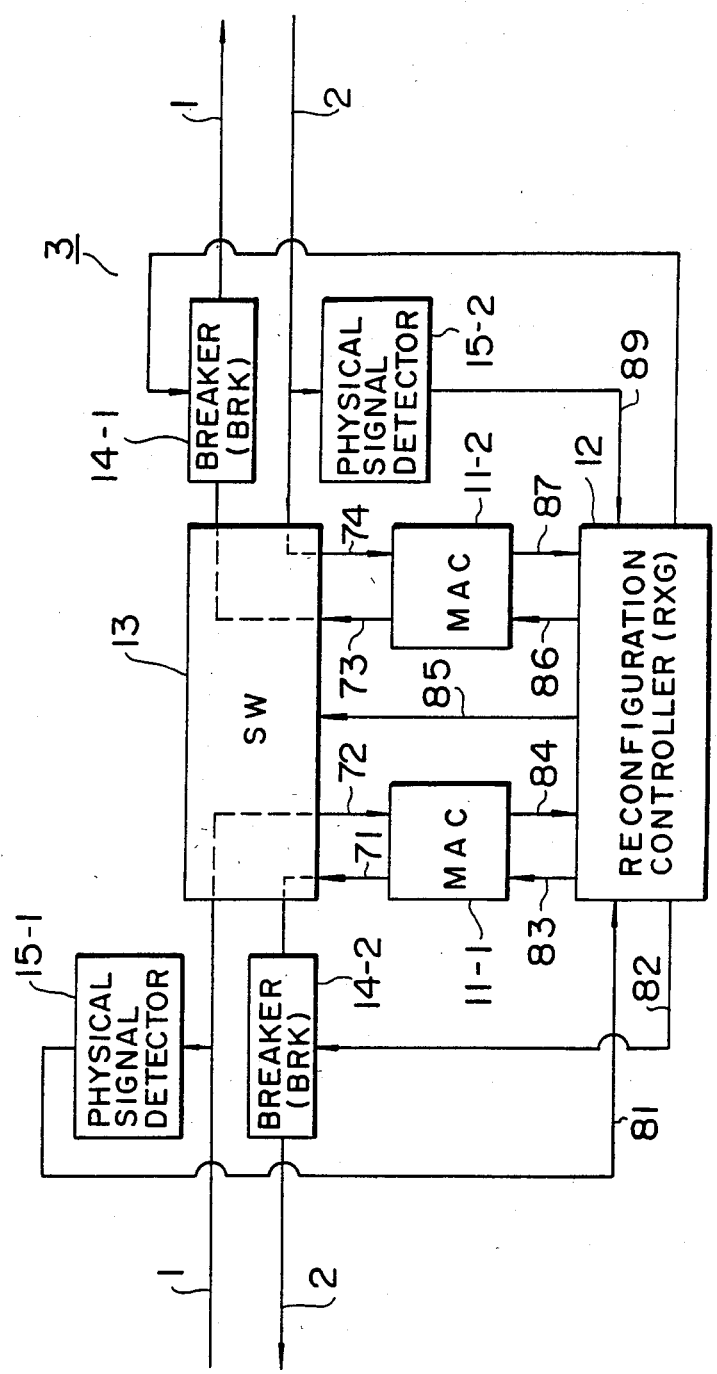
Figure 6:
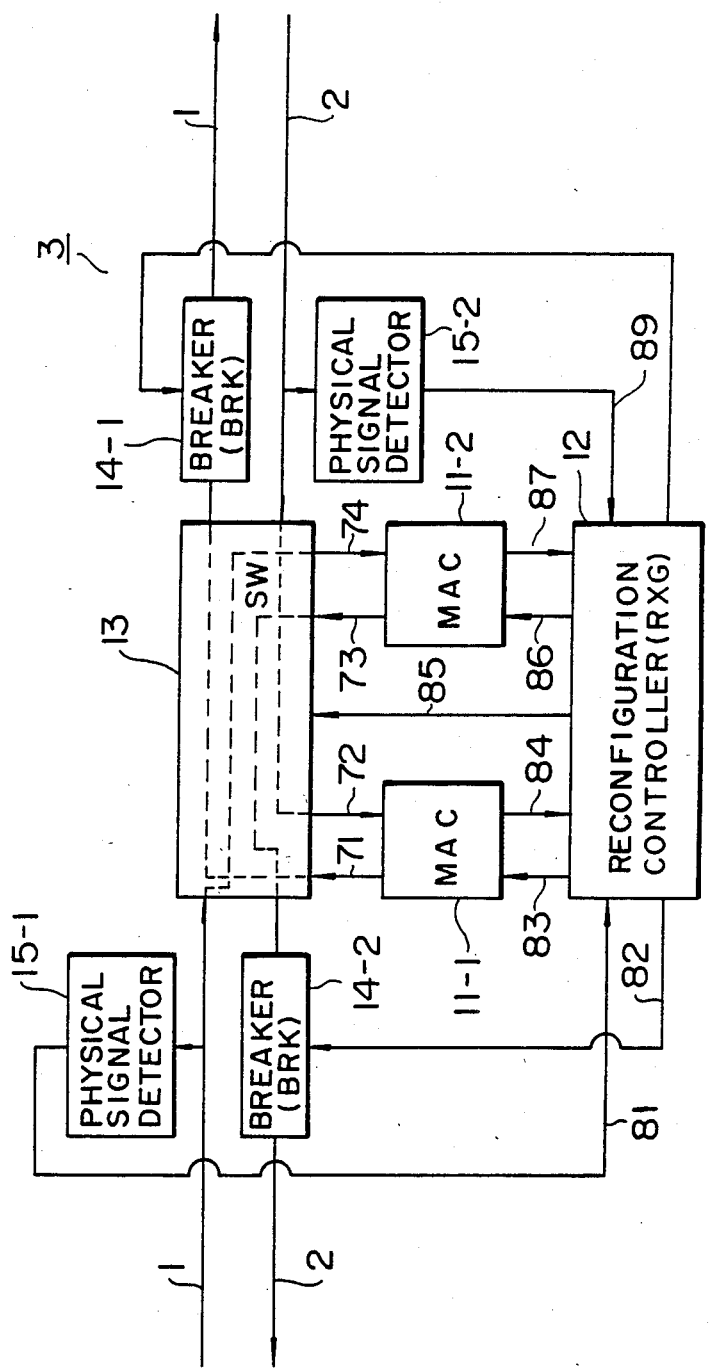

FIGS. 4 to 6 show connection in the SW 13 obtained in the network when the ring reconfiguration has been performed. In the present embodiment, available states of the SW are three states, i.e., a normal connection state (NORMAL), a loop-back state from the first ring 1 to the second ring 2 (WRAPA), and a loop-back state from the second ring 2 to the first ring 1 (WRAPB). In addition to them, there is a connection state referred to as PASS, for example. In the PASS state, inputs from the first ring and the second ring are not connected to MAC 11 but are outputted as they are. However, the PASS state will not be described herein. The PASS state corresponds to the state obtained when the power supply of the concerned DST is turned off, for example.

In the NORMAL state, signals or data received from the upstream side of the first ring 1 are sent to the downstream side of the first ring 1 via the MAC 11-1 as shown in FIG. 4. On the other hand, signals or data received from the upstream side of the second ring 2 are sent to the downstream side of the second ring 2 via the MAC 11-2.

In the WRAPA state, data received from the first ring 1 are sent to the second ring 2 via the MAC 11-1, and data received from the second ring 2 are sent to the first ring 1 via the MAC 11-2 as shown in FIG. 5.

In the WRAPB state, data received from the second ring 2 are sent to the first ring 1 via the MAC 11-1, and data received from the first ring are sent to the second ring via the MAC 11-2 as shown in FIG. 6.

Figure 7:
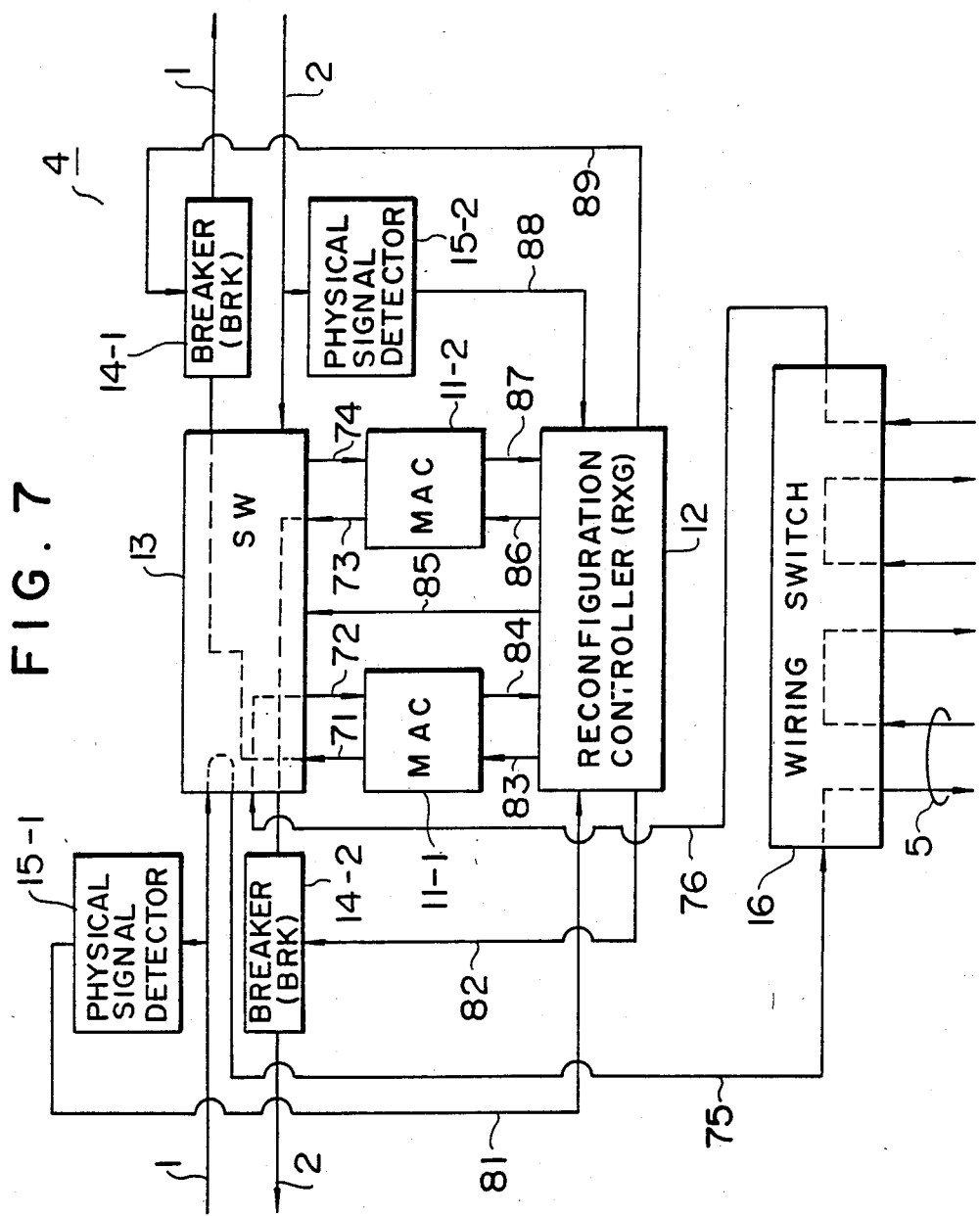
FIGS. 7 and 8 show switch states of a DST having the function of a line concentrator.

As shown in FIG. 7, a DST 4 having wiring concentrator function may also be used instead of the DST (3A to 3D) of FIG. 1. Ring branch lines 5 for connecting a plurality of terminal stations and a switch or ports 16 for connecting the ring branch lines are added to the components of the above described DST 3. Hereafter, such DST 4 having a wiring concentrator is referred to as WC in order to discriminate it from the DST 3. FIG. 7 shows the normal connection state of the WC 4 (which corresponds to the above described NORMAL). The WC 4 differs from the DST 3 shown in FIG. 4 in that the first ring 1 passes through the ring branch lines 5 before entering the MAC 11-1. This point holds true for WRAPA and WRAPB as well. In FIG. 7, numerals 75 and 76 denote data lines on, which signal propagated through the transmission paths 1 and 2 as well as the ring branch line 5 flow.

Figure 8:
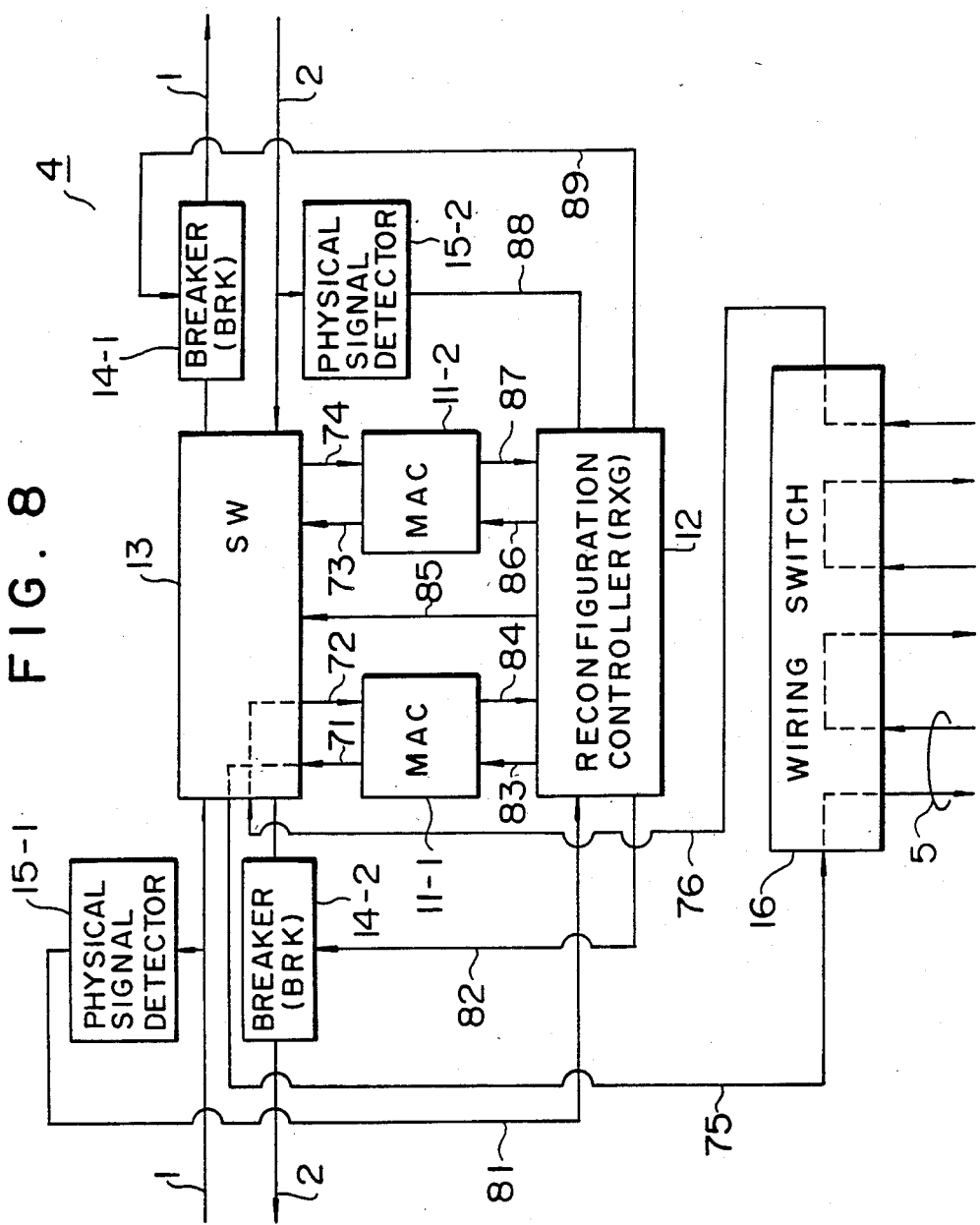

FIG. 8 shows the ISOLATED state effective in the WC 4. In the ISOLATED state, a closed ring (local ring) is formed by the WC 4 alone to make possible at least communication between stations (which are not illustrated in the present embodiment) connected to the ring branch lines 5 of that WC. Normality of the communication function at the above described local ring is supervised by the MAC 11-1 and the MAC 11-2 is used to expand the ring.

The ring expansion is performed when another neighbor DST on the network has risen by turning-on of the power supply and when recovery from a network failure has been attained, for example. In these cases, the PSD 15 senses energy on the transmission path and gives notice to the RXG 12. The RXG 12 connects the MAC 11-2 to the side mentioned in the above described notice (i.e., to the upstream side or the downstream side of the first ring) and checks normality of the communication function along a closed test ring including the MAC (i.e., along a newly expanded ring portion). Connection of the MAC 11-2 to the test ring is performed in the same way as FIG. 5 (WRAPA) and FIG. 6 (WRAPB). In the test ring, it is confirmed that the communication at the MAC level can be normally performed. This confirmation is performed by confirming that the AMP (Active Monitor Present)-MAC frame or the SMP (Stand-by Monitor Present)-MAC frame normally flows in the test ring. When the normality of the communication function at the MAC level has been confirmed, the above described test ring is merged with existing ring to form one expanded ring. This ring expansion follows a course which is opposite to that of the control for looping-back the ring (i.e., for causing the WRAPA or WRAPB state) upon occurrence of a failure. That is to say, the degeneration caused by the WRAPA or WRAPB is related to the expansion by the obverse and reverse relation. The MAC 11-2 shown in FIG. 5 (WRAPA), FIG. 6 (WRAPB) and FIG. 8 (ISOLATED) is used for this expansion. After the normality of the test ring has been confirmed via the MAC 11-2, that test ring is coupled to the ring including the MAC 11-1. It should be noted in coupling both rings that the ring including the MAC 11-1 is already in the operation state. If both rings are unconditionally coupled, there is a possibility that data propagated in the ring assuming the operation state might disappear. In accordance with the present invention, therefore, the DST 3 or the WC 4 performing the ring expansion operation temporarily interrupts the communication in that ring. In the above described "802.5 Token Ring Network" of IEEE, for example, the interruption of communication is attained by temporarily reserving a token at the time when the above described DST 3 or WC 4 has received the token. If there is no token in a ring, all stations in that ring cannot perform communication. As a result, data transmission to the ring can be stopped. By expanding the ring within this period and sending out token again after the completion of the ring expansion, it is possible to prevent the data disappearance at the time of ring expansion. In the ring expansion, properties of the MAC included in that ring or the communication terminal performing the communication via the MAC, for example, are checked. If there are no problems thereafter, both rings are coupled.

Figure 9:
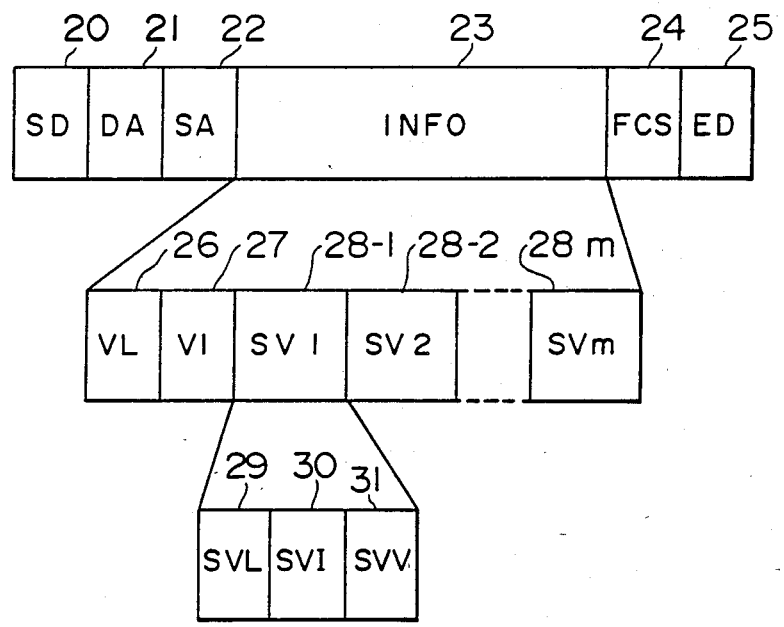
FIG. 9 shows the configuration of a beacon frame.

FIG. 9 shows the configuration of a frame transmitted on the ring. Numeral 20 denotes a start delimiter (SD) for indicating the start of the frame, numeral 21 a destination address (DA), numeral 22 a source address (SA), numeral 23 an information section (INFO), numeral 24 a frame check sequence (FCS), and numeral 25 denotes an end delimiter (ED) for indicating the end of the frame. The INFO 23 includes fields 26 to 28 as described below. Numeral 26 denotes a vector length (VL) field representing the amount of information. Numeral 27 denotes a vector identifier (VI) field representing the kind of information. Numeral 28 denotes a field corresponding to the contents of VI 27. The field 28 includes some subvectors (SV). The SV 28 includes a subvector length (SVL) 29 representing the amount of information, a subvector identifier (SVI) 30 representing the kind of information, and a subvector value (SVV) 31 representing the information value.

In the present embodiment, the BCN frame is defined as follows.

DA (21): Address indicating that the destination is all stations within that ring SA (22): Address of the source communication controller (MAC) 11

Vi (27): Hexadecimal X "0002 (BCN indication)"

SVI (30): Hexadecimal X "02 (BCN identification)"

SVV (31): Hexadecimal X "0001 (reconfiguration control BCN: BR)"

: Hexadecimal X "0002 (Abnormality report BCN: BN)".

The SVI (30) and SVV (31) are the information of SV 1 (28-1). Remaining SV (28) can include the detailed information of detected abnormality and the address of the station located immediately upstream. In the present embodiment, the above described two kinds of BCN, i.e., BR and BN are provided with function described below. The communication controller MAC 11 which is sending BN stops the transmission of BN upon reception of BN or BR and assumes the state for relaying the received BCN. On the other hand, the MAC 11 which is sending BR stops the transmission of BR only upon the reception of BR and assumes the state for relaying the received BR. That is to say, BR has higher priority as compared with BN. When abnormality has been detected in the ring, which of BN and BR is transmitted by the MAC 11 depends upon the state of RIF (Reconfiguration Interlock Flag) provided one to each DST 3 or each WC 4 as described before. All MACs 11 included in the concerned DST or the concerned WC sends out BCN comprising BN or BR defined by by the RIF.

Figure 10:
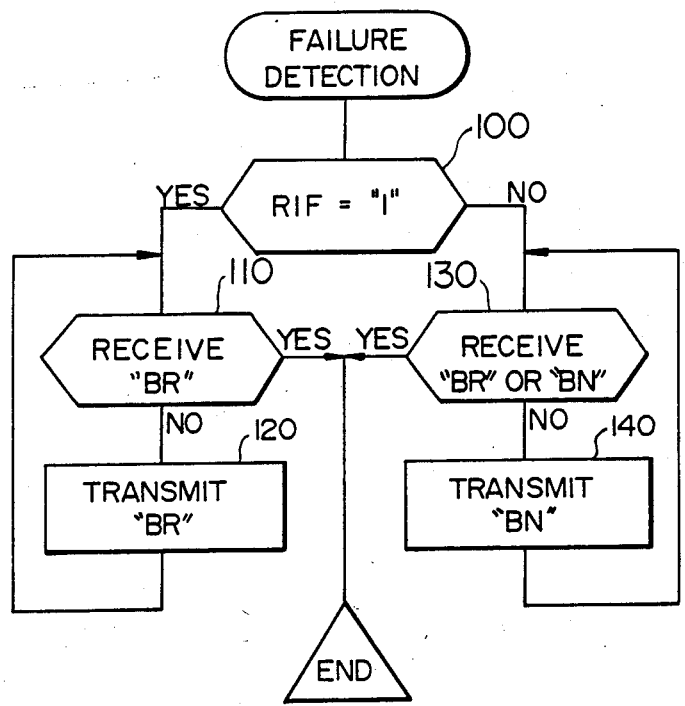
FIGS. 10 and 11 show operation flowcharts of reconfiguration control.

FIG. 10 is a flowchart for illustrating the control operation of the communication controller MAC 11. This control operation is started when the MAC 11 has detected abnormality. Abnormality can be detected by a phenomenon such as disappearance of the timing signal on the ring or a fact that the token is not received for a predetermined time period or longer, for example. In some cases, abnormality of the ring is found by receiving BN or BR sent out by another MAC. When abnormality has been detected, the RIF is checked first of all (step 100). If the RIF is in the set state (i.e., "1"), that DST (or WC) is ready for reconfiguration control. In this case, it is checked whether BR has been received from another DST (or WC) (step 110). Unless BR has been received, BR is sent to the first ring until BR is received from the first ring (step 120). If RIF has not been set yet (i.e., if RIF is "0"), that DST (or WC) is kept from reconfiguration control. In this case, it is checked whether BN or BR has already been received or not (step 130). Unless BN or BR has been received, BN is sent to the first ring until BN or BR has been received from the first ring (step 140).

Figure 11:
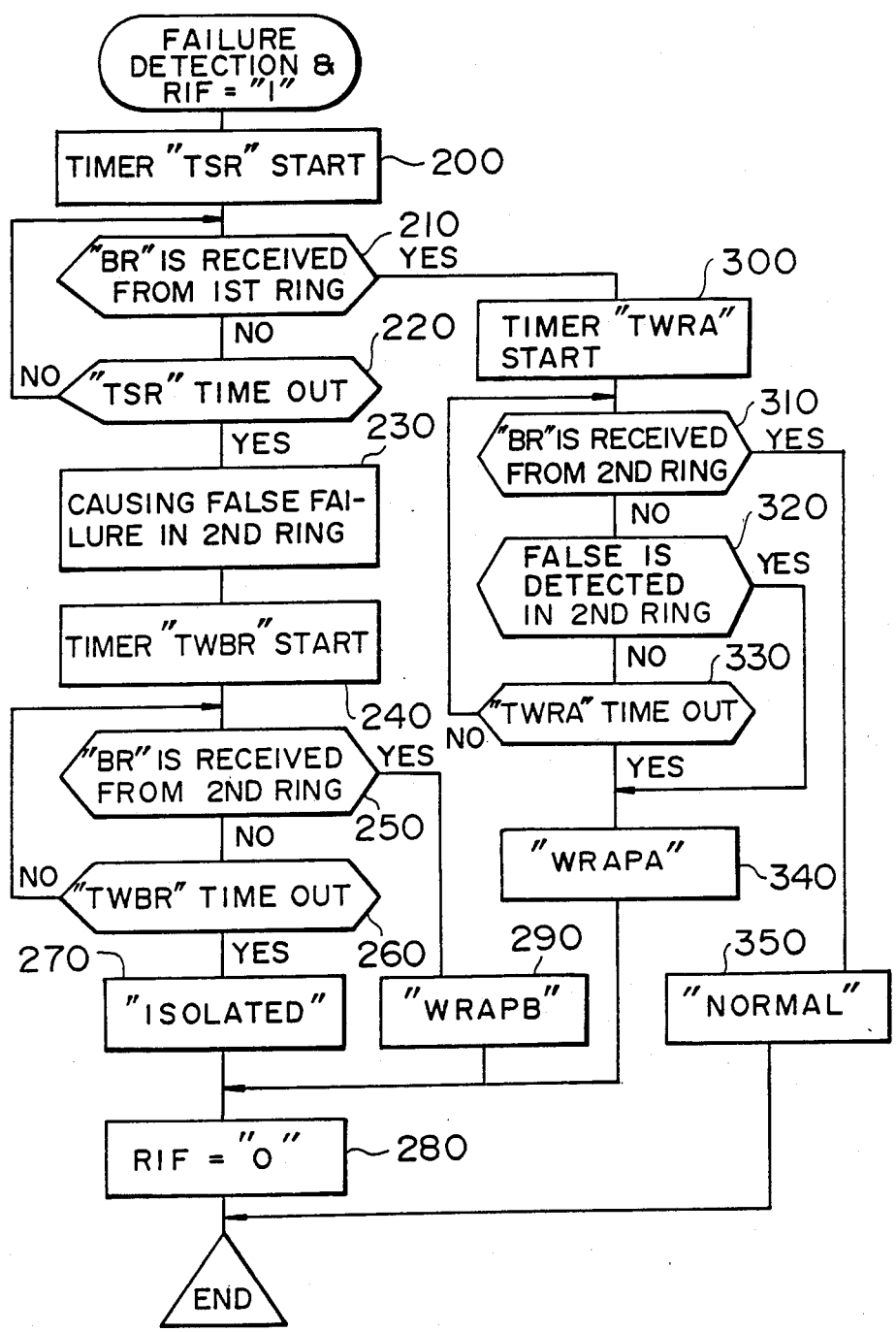

FIG. 11 is a flowchart showing the operation of the reconfiguration controller (RXG) 12. This control flow is started if abnormality has been detected by the MAC 11-1 at the first ring side and if RIF has been set ("1"). When that DST is in the WRAPB state, the MAC 11-1 receives a signal from the second ring. A timer for localizing a failure of the first ring referred to as TSR (Timer for Stabilized Reconfiguration) is started (Step 200). Reception of BR from that ring is waited (Step 210). If BR has not been received until TSR expires (YES at step 220), it is judged that its own reconfiguration controller (RXG) 12 (i.e., DST 3 or WC 4) is located immediately downstream with respect to the failure. With a false failure in the second ring caused by the breaker 14-2 (step 230), a timer for waiting ring close confirmation referred to as TWBR (Timer for Wait Reconfiguration Beacon) is started (step 240). In this case, "immediately downstream with respect to the failure" means that another RXG 12 does not exist between its own RXG 12 and the failure point, in other words, that its own RXG 12 is the configuration controllable RXG located at the most upstream with respect to the failure. In accordance with the present invention, the reception of BR from the second ring is supervised after the timer TWBR has been started. If BR is received before TWBR expires (YES at step 250), RXG 12 makes switch 13 in "WRAPB" state (step 290) and RIF is turned to "0"(step 280). In application to "802.5 Token Ring Network"of IEEE, the BR for supervising the reception at step 250 is preferably the BR transmitted to the first ring by the MAC 11-1 of the DST 3 (or WC 4) of that RXG 12. If the MAC 11-2 receives the BR, which has been sent to the first ring by the MAC 11-1, from the second ring as a result of WRAPA, the RXG 12 can confirm that the ring has been closed. As a result, the active monitor can be established more rapidly.

If TWBR expires without receiving the expected BR from the second ring (YES at step 260), the RXG 12 make the switch 13 in "ISOLATED" state (step 270) and turns RIF to "0" (step 280).

Operation performed when the RXG 12 is located immediately downstream with respect to the failure has heretofore been described. If the RXG 12 is not located immediately below the failure point, i.e., if another RXG 12 assuming the reconfiguration controllable state exists between the RXG 12 and the failure point, BR generated by the above described other RXG is received before TSR expires (YES at Step 210). In this case, a timer for waiting the response of the reconfiguration control of the second ring referred to as TWRA (Timer for Wait Reconfiguration Acknowledge) is started (Step 300) and the reception of BR in the second ring is supervised. If BR is received before TWRA expires (YES at Step 310), RXG 12 makes the switch 13 in "NORMAL" state (Step 350). If a failure has been detected in the second ring (YES at Step 320) or if TWRA expires (YES at step 330), the RXG 12 makes the switch 13 in WRAPA state (Step 340) and RIF is turned to "0"(Step 280). Usually and especially in case of reconfiguration caused by a single failure, the failure of the second ring detected at Step 320 is a false failure intentionally caused at step 230 by the RXG 12 which has been detected in the second ring in the present embodiment (YES at Step 320), RXG 13 immediately makes the switch 13 in WRAPA state (Step 340). This is based on the assumption that only one station detects the above described failure. An example of detection of this failure is the detection of this failure is the detection of abnormality of the physical signal in "802.5 Ring Network" at IEEE. In case a plurality of stations detect the above described failure, control for localizing the failure position, i.e., control for recognizing the RXG located immediately below the failure is needed. The timer TSR started at Step 200 and checked at Step 220 is used to localize the failure position. This timer is not required in case the failure position can be recognized at the time when the abnormality has been detected. In case the above described abnormality of physical signal is detected by PSD 15, therefore, the recognition of the failure position by the TSR can be omitted. That is to say, the value of the above described timer TSR may be reset when abnormality of the physical signal has been detected.

Figure 12:
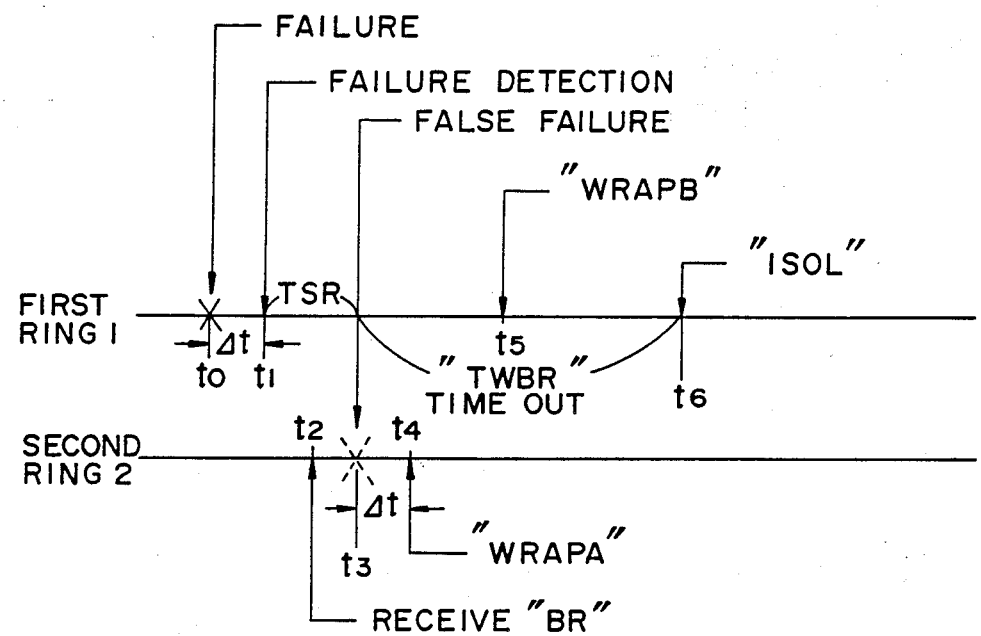
FIG. 12 shows the time chart of reconfiguration control.

FIG. 12 is a time chart facilitating the understanding of the operation of the reconfiguration control of the above described embodiment of the present invention. Generated events are shown in time series along respective time axes of the first ring and the second ring. A failure caused in the first ring at $t_0$ (marked by X) is detected as abnormality at time $t_1$ when time ($\Delta t$) required for abnormality detection in that ring has elapsed. Assuming now that the flag RIF of the station which has detected this abnormality is in the set state ("1"), BR is sent to the first ring by the operation of the MAC 11-1 described by referring to FIG. 10. In the RXG 12, the timer TSR is started and enters the state of supervising the reception of BR from the first ring (step 210). If the flag RIF of the station which has detected the above described abnormality is "0", BN is sent out from this station. If the above described abnormality has been detected by a plurality of stations, only the RXG 12 located immediately downstream with respect to the failure (RXG which is a candidate for WRAPB) cannot receive BR from the upstream of the first ring and TSR expires. Other RXGs receive BR from the first ring at time $t_2$ before TSR expires and become candidate RXGs for WRAPA, respectively. At $t_3$ when TSR expires, the RXG which is a candidate for WRAPB causes such an intentional false failure (as to make the physical signal abnormal) in the second ring by the breaker 14-2 (Step 230). Subsequently, the timer TWBR is started (step 240). The RXG supervises the reception of BR sent by the MAC 11-1 of its own ST from the second ring. On the other hand, the RXG which has become a candidate for WRAPA starts the timer TWRA at time $t_2$ and supervises the reception of BR from the second ring or detection of occurrence of a failure on the second ring. The false failure intentionally caused in the above described second ring by the RXG which is a candidate for WRAPB is detected by the RXG which is only one candidate for WRAPA adjacent to the failure position X (step 320). This RXG becomes WRAPA at time $t_4$ (step 340). The RXGs which are remaining WRAPA candidates receive BR looped-back by the above described RXG assuming the WRAPA state (i.e., BR sent to the first ring by the MAC 11-1 included in the above described stations which are candidates for WRAPB) or BR sent to the second ring by the MAC 11-2 which has sensed the above described false failure X from the second ring before the timer TWRA expires, resulting in the "NORMAL" state. If WRAPA has been formed on the network, the BR sent to the first ring is looped-back by the WRAPA to return to the above described RXG, which is the transmission source and a candidate for WRAPB, via the second ring at time $t_5$ before the timer TWBR expires. Since the close of the ring can be confirmed by the reception of the above described BR, the RXG which is the transmission source is able to become WRAPB at the time of BR reception $t_5$. If the RXG which is a candidate for WRAPB cannot receive the above described BR and the timer TWBR expires (at time $t_6$), the station turns into the ISOLATED state.

Figure 13A:
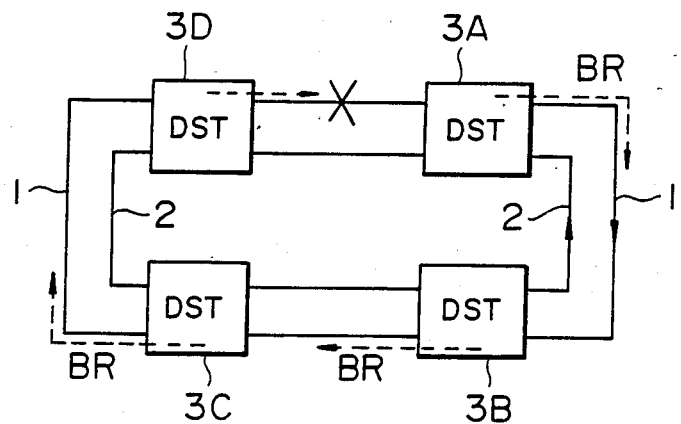
FIGS. 13A to 13E show a process of operation of reconfiguration control.
Figure 13B:
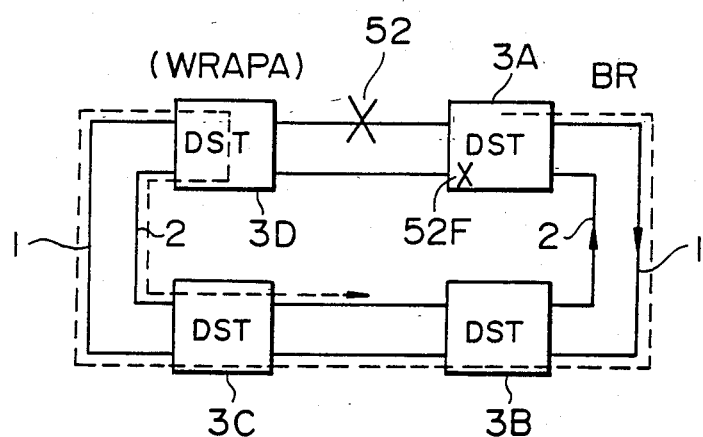
Figure 13C:
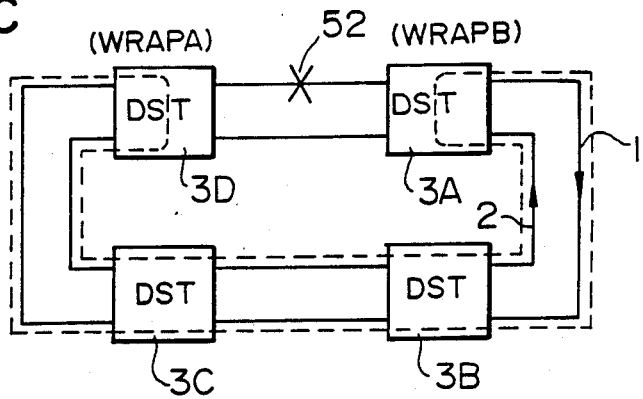

FIGS. 13A to 13C show a series of operation of the above described reconfiguration control in the form of models.

FIG. 13A: If abnormality caused by a failure 52 generated in the first ring 1 has been detected, each of DST 3A to 3E sends BR to the first ring. It is now supposed that RIF is in the set state ("1"; reconfiguration controllable state) in all DSTs.

FIG. 13B: When a predetermined time (TSR) has elapsed, a DST which could not receive BR from the upstream, i.e., DST 3A located immediately downstream with respect to a failure 52 causes a false failure 52F in the second ring 2. DST 3D which has already received BR from the first ring 1 turns into the WRAPA state at the time when it detects the failure in the second ring.

FIG. 13C: The DST 3A which is sending BR turns into the WRAPB state when it has received BR sent by its own DST from the second ring. The DST 3A and the DST 3D which have completed the countermeasure against the failure 52 and which have been turned into the WRAPA or WRAPB state reset the RIF ("0"; reconfiguration control constraint state).

Figure 13D:
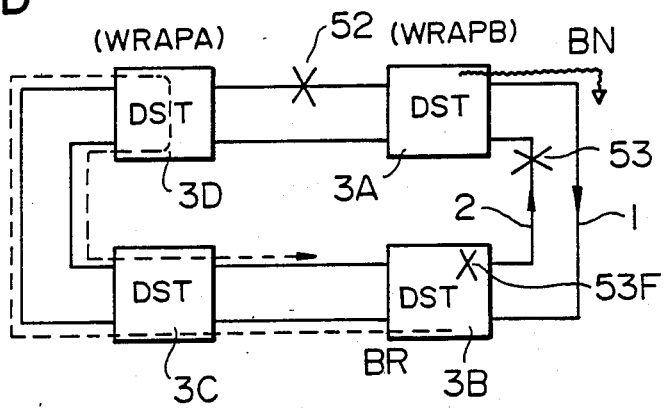
Figure 13E:
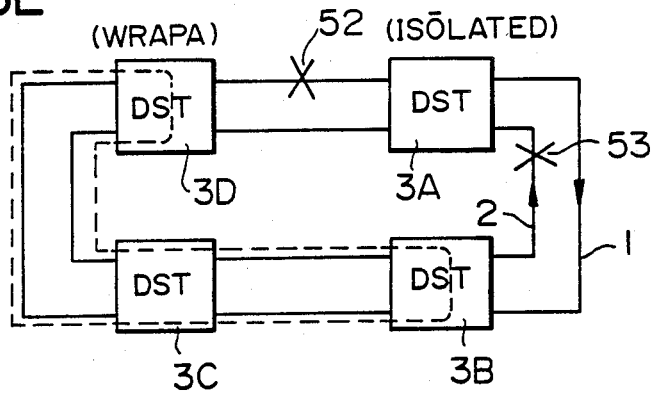

FIGS. 13D and 13E show the reconfiguration control operation of the network performed when a new failure 53 occurs in the second ring 2, i.e., when multiple failures occur.

FIG. 13D: The DST 3A located immediately downstream with respect to the newly generated failure 53 already assumes the WRAPB state. Since the RIF is not set yet and reconfiguration control is restrained, the DST 3A which has sensed the above described failure 53 sends out BN. When the DST 3B which is reconfiguration controllable in the NORMAL state sends out BR when it has received the above described BN or it has known the occurrence of a failure by oneself. Unless the DST 3B receives BR from the first ring 1 before the timer TSR expires, the DST 3B causes a false failure 53F in the second ring.

FIG. 13E: The BR sent to the first ring 1 by the DST 3B is looped-back by the DST 3D assuming the WRAPA state. The DST 3B which has received the above described BR from the second ring 2 turns into the WRAPB state. Since the DST 3A which has been in the WRAPB state until then can receive from neither the first ring nor the second ring, transition is made to the ISOLATED state when the timer TWBR expires. If the network specification prescribes that abnormality of the physical signal caused in the ring is detected by only one station adjacent to the abnormal point, the DST 3A already assuming the WRAPB state may be immediately turned into the ISOLATED state when the DST 3A has detected abnormality 53 of the physical signal caused in the second ring. In the same way, the DST 3D assuming the WRAPA state may be turned into the ISOLATED state when it has detected abnormality of the physical signal in the first ring.

Figure 14:
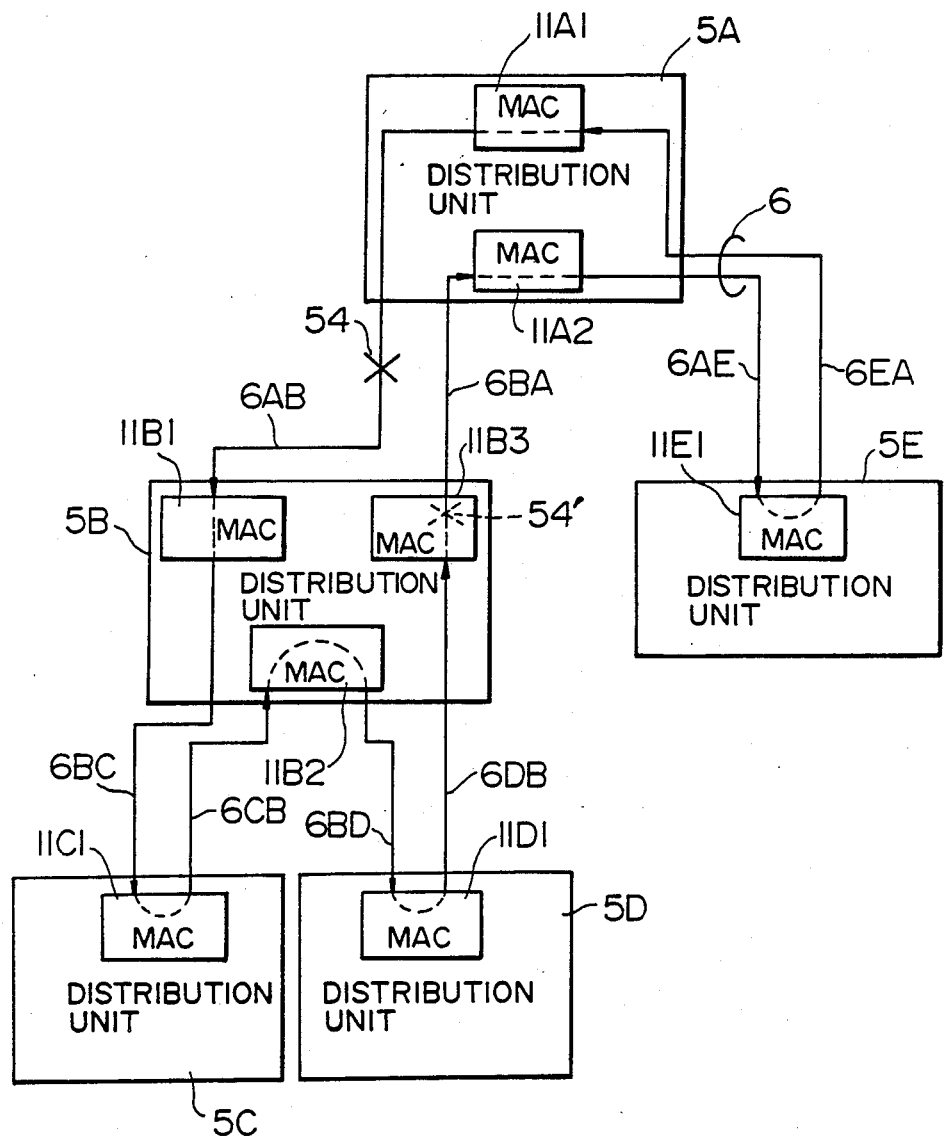
FIGS. 14 to 17 show application examples of the present invention, respectively.

FIG. 14 shows an example of application of the present invention. In FIG. 14, 5A to 5E denote distribution units (DU) which correspond to the above described DST and WC. Numeral 11 (11A1 to 11E1) denotes a communication controller, which corresponds to the above described MAC. Numeral 6 denotes a link for connecting each MAC. The link 6 includes opposite transmission paths. That is to say, the link 6 corresponds to a dual ring system formed by the above described first ring and second ring connecting DSTs in the system of FIG. 1. In the transmission path of the system of FIG. 14, there is no distinction between the first ring (active) and the second ring (stand-by). In FIG. 14, the above described reconfiguration controller (RXG) and the above described transmission path changeover switch are omitted to simplify the drawing. In the same way as DST and WC, however, each of DU 5A to DU 5E has these components. Although respective MACs 11 are connected in a ring form, they have a treelike property in the network topology. Assuming now that the failure 54 is caused in a link 6AB between DU 5A and DU 5B, the procedure of the countermeasure according to the present invention will now be described.

Upon detection of the above described abnormality 54, each MAC 11 sends out beacon BR. In this case, only MAC 11B1 located immediately downstream with respect to the failure 54 cannot receive BR. Therefore, the DU 5B judges that there is a failure in the link 6AB located immediately upstream with respect to the MAC 11B1. The DU 5B causes a false failure 54' in a link 6BA located at the output side of the MAC 11B3 forming a counterpart to the above described failure link 6AB and supervises the reception of the following BR. When the MAC 11B3 receives BR sent out from its own DC 5B, the DU 5B interchanges input links of the MAC 11B1 and the MAC 11B3 each other and reconfigures links so that the link 6DB enters the MAC 11B1. Since the false failure 54' has been caused in the link 6BA, only the MAC 11A2 does not receive BR in the DU 5A. In accordance with the same procedure as that of DU 5B, the DU 5A interchanges input links of MAC 11A2 and MAC 11A1 each other and reconfigures links so that the link 6EA may be connected to the input of MAC 11A2. As a result, the ring network is divided into a first ring network formed by the MAC 11B1, MAC 11C1, MAC 11B2 and MAC 11D1 and a second ring network formed by the MAC 11A2 and MAC 11E1. Further, the MAC 11A1 and the MAC 11B3 form a local ring comprising the link 6AB including the failure 54 and the link 6BA. It is possible to assign the reconfiguration control constraint flag RIF to each MAC. In the above described case, RIFs of the MAC 11A1 and the MAC 11B3 included in the local failure ring are reset state (i.e., RIFs are "0").

Figure 15:
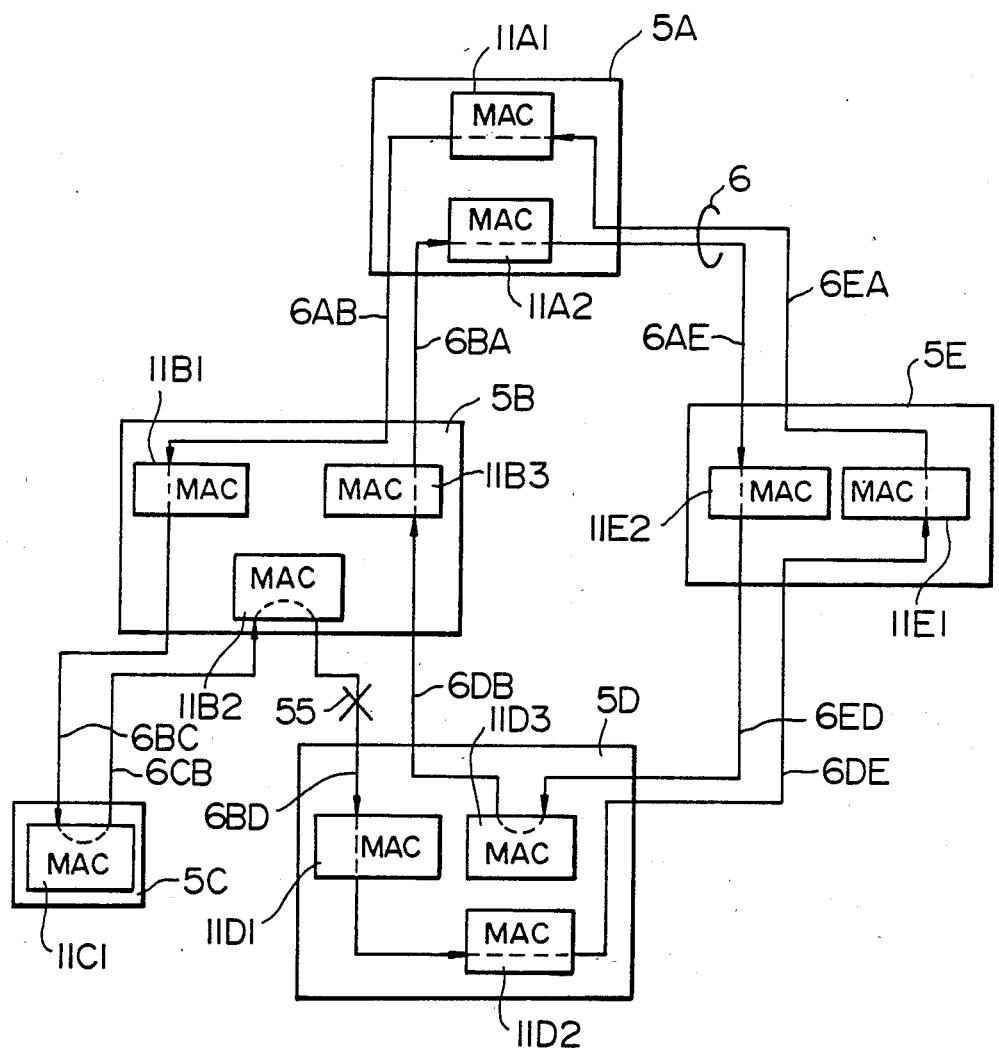

FIG. 15 shows another example of application of the present invention in which a plurality of distribution units are interconnected by double rings. Distribution units (DU) 5A to 5E forming the network are the same as those of FIG. 14 excepting that the number of MACs included in 5D and 5E is increased. The reconfiguration procedure taken when a failure 55 occurs in a link 6BD between the DU 5B and DU 5D will now be described.

The MAC 11D1 detects the above described failure and sends out BR. Since the MAC 11D1 cannot receive the above described BR from an input link 11BD within a predetermined time, however, the DU 5D judges that a failure has occurred in the link 11D1 located immediately upstream with respect to the MAC 11D1 and causes a false failure in a link (output transmission path to the distribution unit 5B) forming a counterpart to this link (input transmission path from the DU 5B), i.e., in an output transmission path 6DB of the MAC 11D3. Other MACs (11D2, 11E1, 11A1, 11B1, 11C1 and 11B2) within the first ring including the MAC 11D1 are in the state for waiting the reconfiguration control by the reception of the above described BR. When the MAC 11B3 included in the second ring senses a failure (abnormality of the physical signal resulting from the false failure intentionally caused by the MAC 11D3) in the input link, the DU 5B performs the reconfiguration control operation. That is to say, the DU 5B finds an MAC connected to the link 6BD forming a counterpart to the link 6DB whose failure has been sensed, i.e., the MAC 11B2 in this case, and interchanges the output link of the MAC 11B3 which has sensed the failure with the output link of the above described MAC 11B2. As a result, the output of the MAC 11B2 is connected to the transmission path 6BA which has been connected to the output of the MAC 11B3 till then, and the output of the MAC 11B3 is connected to the transmission path 6BD which has been connected to the output of the MAC 11B2 till then. By this connection change, BR sent out by the MAC 11D1 is looped-back to arrive at the MAC 11D3. When the BR thus makes a round and returns to the DU 5D which is the transmission source, the DU 5D changes connection so that the input link 6ED of the MAC 11D3 may be interchanged with the input link 6BD of the MAC 11D1. As a result, the MAC 11D3 and the MAC 11B3 are connected to the link 6BD having a failure and the link 6DB forming its counterpart. It is thus possible to form a ring network through which other MACs can communicate normally.

Figure 16:
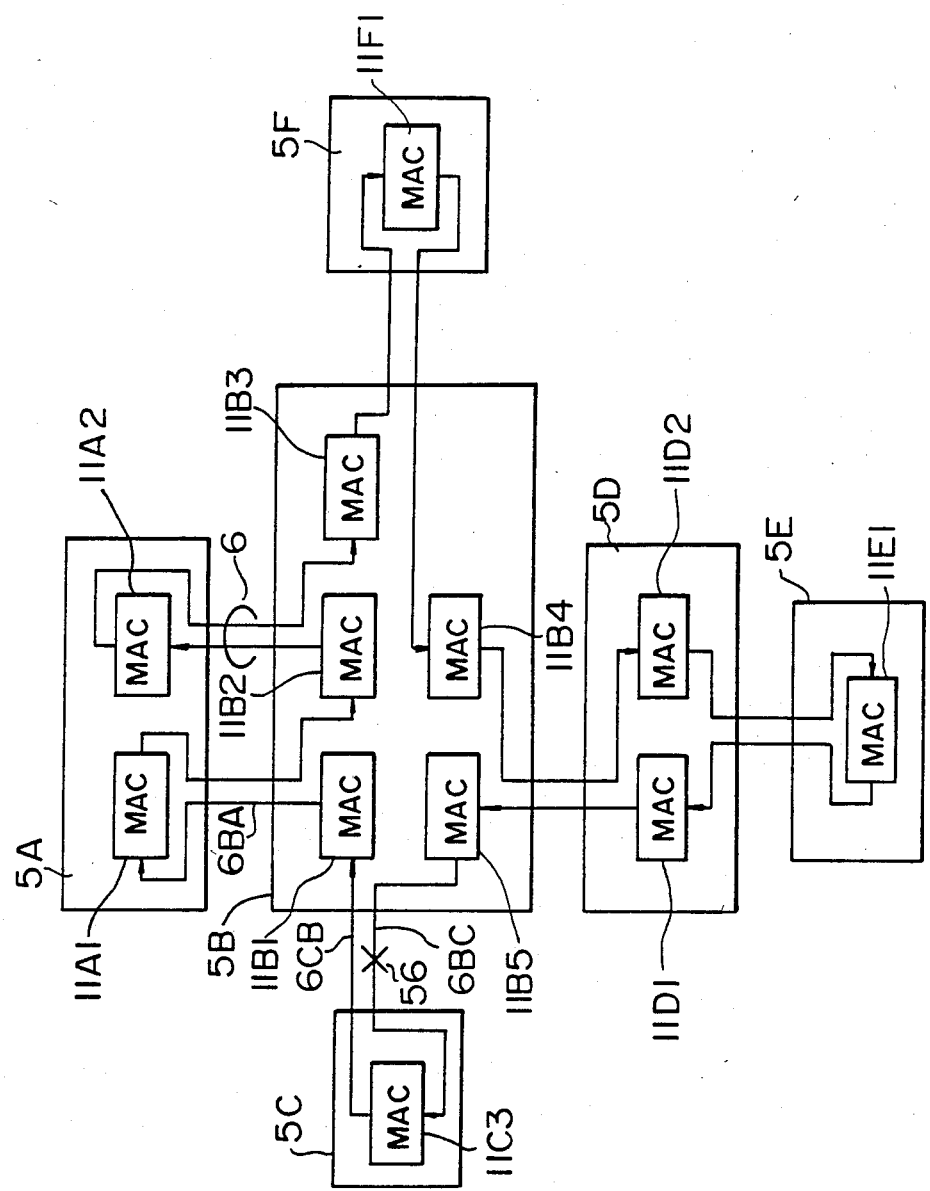

FIG. 16 shows still another example of application of the present invention. When a failure 56 has occurred on a transmission path 6BC between the DU 5B and DU 5C, the MAC 11C3 in the DU 5C continues to send BR for a predetermined time period or longer. As a result, the reconfiguration controller RXG in the DU 5C which is omitted in the drawing causes a false failure in the link 6CB located at the output side of the MAC 11C3. After receiving the above described BR, the RXG in the DU 5B performs the reconfiguration control operation in response to the detection of the abnormality by the MAC 11B1. That is to say, the RXG in the DU 5B interchanges the output link 6BA of the MAC 11B1 which has detected abnormality with the output link 6BC of the MAC 11B5 and makes the local ring having the failure 56 include the MAC 11C3 and the MAC 11B1. Since the output of the MAC 11B5 is connected to the link 6BA, other MACs excepting the MAC 11C3 and MAC 11B1 form a normal ring with the failure link bypassed.

Figure 17:
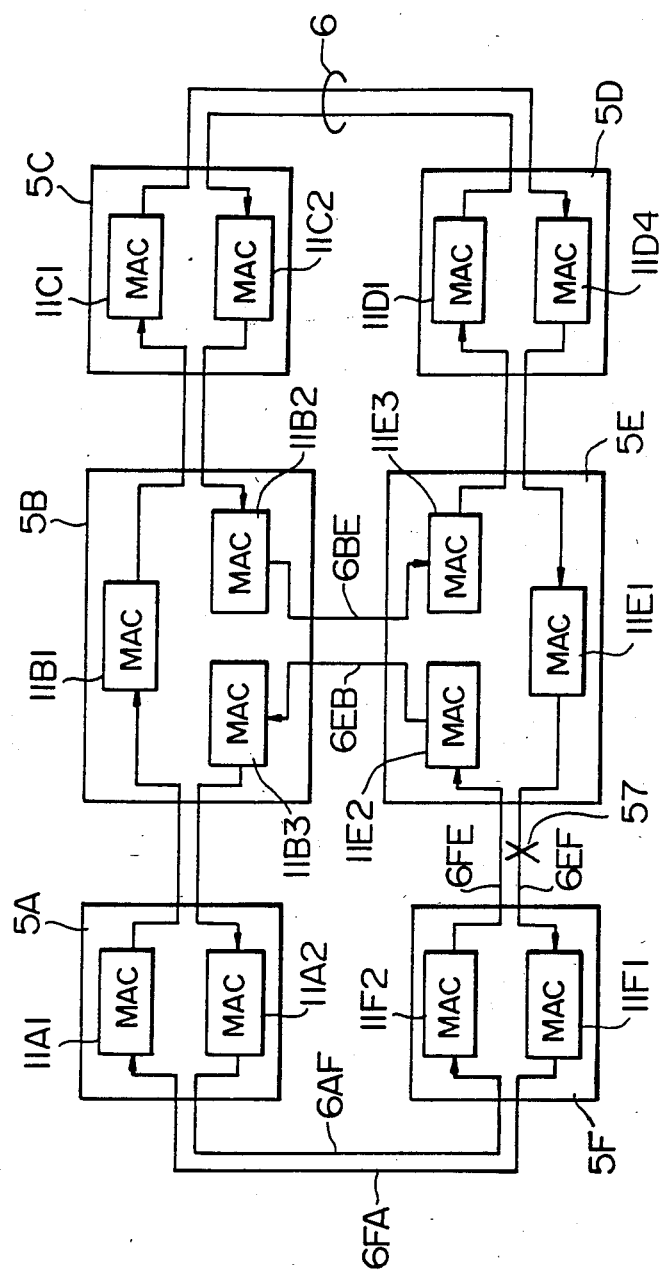

FIG. 17 shows still another example of application of the present invention. When a failure occurs in a link 6EF located between the DU 5E and the DU 5F, the MAC 11F1 located immediately downstream with respect to the failure continues to send BR. As a result of the above described reconfiguration control operation of the present invention, the input link 6AF of the MAC 11F2 is interchanged with the input link 6EF of the MAC 11F1, and the output link 6EF of the MAC 11E1 is interchanged with the output link 6EB of the MAC 11E2. Thereby the MAC 11F2 and the MAC 11E2 remain in the local ring having the failure 57. Other MACs perform normal communication by one closed ring looped-back at the DU 5E and the DU 5F.

In case of the present embodiment as well, reconfiguration of the network can be controlled in accordance with the same procedure as that of other embodiments. That is to say, the MAC which has sensed the abnormality of the ring sends the beacon BR serving as both abnormality notice and reconfiguration control request to localize the failure. Other MACs receive the BR and sense the abnormality of that ring. Thereafter, other MACs receive data which can be received only when that ring is normal, such as the token or a frame sent for actively notifying that the ring is normal and thereby detect that the ring has changed to its normal state. A DU which has judged that it is adjacent to the failure position causes a false failure in a link (output link) forming a counterpart to the failure link (input link) to make the DU located upstream with respect to the failure link detect that the DU is adjacent to the failure. Depending upon the reconfiguration, a plurality of closed (normal) ring networks might be formed separately. In this case as well, it is possible to couple a plurality of ring networks to form a single network after the confirmation of the normality of the MAC level communication function in accordance with the procedure of the network expansion. On the contrary to the expansion, it is possible to perform the separation of a particular ring network in the same way.

We claim:

1. A method for controlling a plurality of stations in a communication system which comprises first and second ring transmission lines for connecting said stations and for providing opposite signal transmission directions, each of said stations having layered communication architecture including a physical layer level communication function and a medium access control layer level communication function, the method comprising the steps of:

operating the medium access control layer level communication function of a first one of said stations which is located immediately downstream with respect to a failure position in said first transmission line to send a notice signal to said first transmission line in response to detection of a physical failure in said first transmission line by the physical layer level communication function of said first station;

forming a first loop-back path from said first transmission line to said second transmission line by a second one of said stations which is located immediately upstream with respect to said failure position in said first transmission line to send back said notice signal received from said first transmission line to said second transmission line; and forming a second loop-back path from said second transmission line to said first transmission line by said first station when the medium access control layer level communication function detects that the notice signal returns back via said first loop-back path.

2. A method according to claim 1, wherein said first station causes an intentional failure on the downstream side of said transmission line while said medium access control layer level communication function sends said notice signals, and said second station forms said first loop-back path after the detection of said intentional failure and the reception of said notice signal by said second station.

3. A communication system having a plurality of stations connected by a first and second ring transmission lines whose signal transmission directions are opposite to each other, each of said stations comprising:

first detecting means for detecting a physical failure in said first transmission line;

second detecting means for detecting a physical failure in said second transmission line;

control means for performing media access control of said first and second transmission lines, and for sending a notice signal to said first transmission line in response to the detection of a physical failure in said first transmission line by said first detecting means;

means for causing an intentional physical failure of signal transmission on said second transmission line;

switching means for changing the connection among said control means, said first transmission line and said second transmission line; and reconfiguration means for operating said intentional physical failure causing means when said first detecting means detects said physical failure in said first transmission line, for operating said switching means so as to connect the upstream side of said first transmission line and the downstream side of said second transmission line through said control means if said second detecting mans detects said intentional physical failure and said control means detects that a notice signal is generated in said first transmission line by the other one of said stations, and for operating said switching means so as to connect the downstream side of said first transmission line and the upstream side of said second transmission line through said control means if the notice signal generated by said control means returns back from said second transmission line.

* * * * *